(12) United States Patent
Hwang et al.

(10) Patent No.: US 10,115,951 B2
(45) Date of Patent: Oct. 30, 2018

(54) SWELLING TAPE FOR FILLING GAP

(71) Applicant: LG Chem, Ltd., Seoul (KR)

(72) Inventors: Ji Young Hwang, Daejeon (KR); Byung Kyu Jung, Daejeon (KR); Yoon Tae Hwang, Daejeon (KR); Se Woo Yang, Daejeon (KR); Suk Ky Chang, Daejeon (KR); Sung Jong Kim, Daejeon (KR); Min Soo Park, Daejeon (KR); Cha Hun Ku, Daejeon (KR)

(73) Assignee: LG Chem, Ltd. (KR)

( * ) Notice: Subject to any disclaimer, the term of this patent is extended or adjusted under 35 U.S.C. 154(b) by 569 days.

(21) Appl. No.: 14/435,779

(22) PCT Filed: Nov. 18, 2013

(86) PCT No.: PCT/KR2013/010473
§ 371 (c)(1),
(2) Date: Apr. 15, 2015

(87) PCT Pub. No.: WO2014/077647
PCT Pub. Date: May 22, 2014

(65) Prior Publication Data
US 2015/0270524 A1  Sep. 24, 2015

(30) Foreign Application Priority Data

Nov. 16, 2012 (KR) .......... 10-2012-0130477
Nov. 18, 2013 (KR) .......... 10-2013-0140163

(51) Int. Cl.
*H01M 6/02* (2006.01)
*H01M 2/14* (2006.01)
(Continued)

(52) U.S. Cl.
CPC .......... *H01M 2/1686* (2013.01); *C09J 7/22* (2018.01); *C09J 7/38* (2018.01); *C09J 7/401* (2018.01);
(Continued)

(58) Field of Classification Search
None
See application file for complete search history.

(56) References Cited

U.S. PATENT DOCUMENTS 5,059,269 A * 10/1991 Hu .......... A61L 33/068
156/244.11
6,083,211 A  7/2000 DesMarais
(Continued)

FOREIGN PATENT DOCUMENTS

CN  102649898 A  8/2012
CN  102653662 A  9/2012
(Continued)

OTHER PUBLICATIONS

International Search Report for Application No. PCT/KR2013/010473 dated Feb. 18, 2014.
(Continued)

*Primary Examiner* — Frank D Ducheneaux
(74) *Attorney, Agent, or Firm* — Lerner, David, Littenberg, Krumholz & Mentlik, LLP

(57) ABSTRACT

The present application relates to a swelling tape and a method of filling a gap. The swelling tape is, for example, applied in gaps in which a fluid is present and deformed into a three-dimensional shape to fill the gaps and fix in place objects separated by gaps as needed.

14 Claims, 3 Drawing Sheets

(51) Int. Cl.
*H01M 10/0569* (2010.01)
*C09J 7/22* (2018.01)
*C09J 7/38* (2018.01)
*H01M 2/16* (2006.01)
*C09J 7/40* (2018.01)
*H01M 6/16* (2006.01)
*H01M 10/04* (2006.01)
*H01M 10/0587* (2010.01)

(52) U.S. Cl.
CPC ............ *H01M 2/14* (2013.01); *H01M 2/145* (2013.01); *H01M 2/1653* (2013.01); *H01M 6/02* (2013.01); *H01M 6/164* (2013.01); *H01M 10/0431* (2013.01); *H01M 10/0587* (2013.01); *C09J 2201/606* (2013.01); *C09J 2201/622* (2013.01); *C09J 2203/33* (2013.01); *C09J 2433/00* (2013.01); *H01M 10/0569* (2013.01); *H01M 2300/0028* (2013.01)

(56) References Cited

U.S. PATENT DOCUMENTS

| | | | |
|---|---|---|---|
| 6,350,512 B1 | 2/2002 | Hurley et al. | |
| 9,222,003 B2 | 12/2015 | Kim et al. | |
| 2004/0224117 A1* | 11/2004 | Amano | B29C 47/0021 428/40.1 |
| 2011/0077345 A1 | 3/2011 | Erdem et al. | |
| 2012/0040776 A1* | 2/2012 | Kim | A63B 37/0003 473/371 |
| 2012/0202051 A1 | 8/2012 | Iseki et al. | |
| 2012/0219835 A1 | 8/2012 | Kawabe et al. | |
| 2012/0263948 A1 | 10/2012 | Amano et al. | |
| 2013/0280570 A1* | 10/2013 | Kim | H01M 2/10 429/94 |
| 2013/0306221 A1 | 11/2013 | Kim et al. | |

FOREIGN PATENT DOCUMENTS

| | | |
|---|---|---|
| CN | 102732191 A | 10/2012 |
| EP | 2511357 A1 | 10/2012 |
| EP | 2657310 A2 | 10/2013 |
| JP | 2002-506889 | 3/2002 |
| JP | 2004137405 A | 5/2004 |
| JP | 2005290315 A | 10/2005 |
| JP | 2007-262320 A | 10/2007 |
| JP | 2010076287 A | 4/2010 |
| JP | 2012184396 A | 9/2012 |
| JP | 2012219247 A | 11/2012 |
| KR | 10-2011-0022001 | 3/2011 |
| KR | 10-2012-0087105 A | 8/2012 |
| WO | 2012102587 A2 | 8/2012 |
| WO | 2012102588 A2 | 8/2012 |
| WO | WO 2012/102585 A2 * | 8/2012 |

OTHER PUBLICATIONS

Office Action from Chinese Application No. 201380060159.6, dated Jul. 28, 2016.
Extended Search Report from European Application No. 13855161.9, dated Apr. 21, 2016.

* cited by examiner

[FIG. 1]
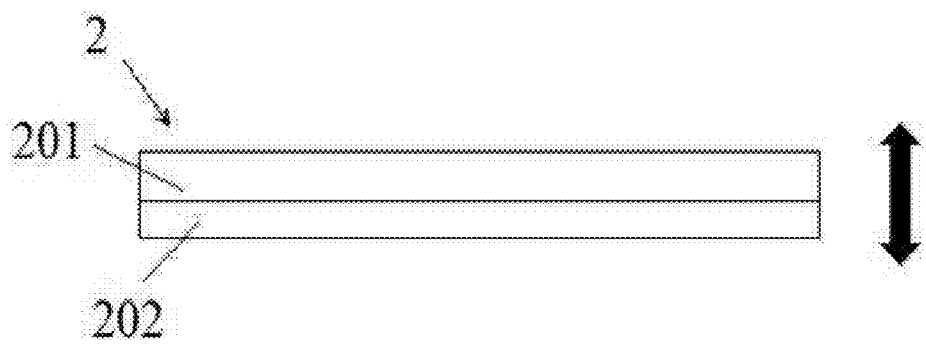
[FIG. 2]
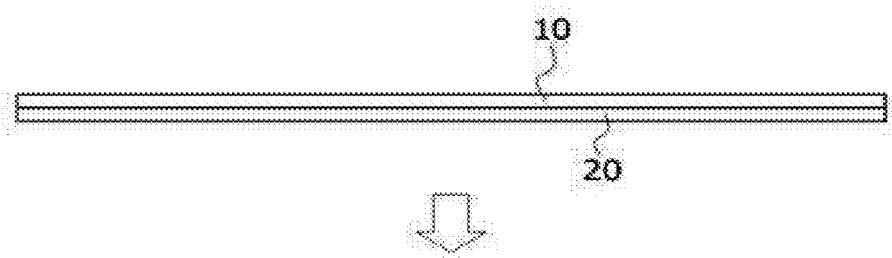
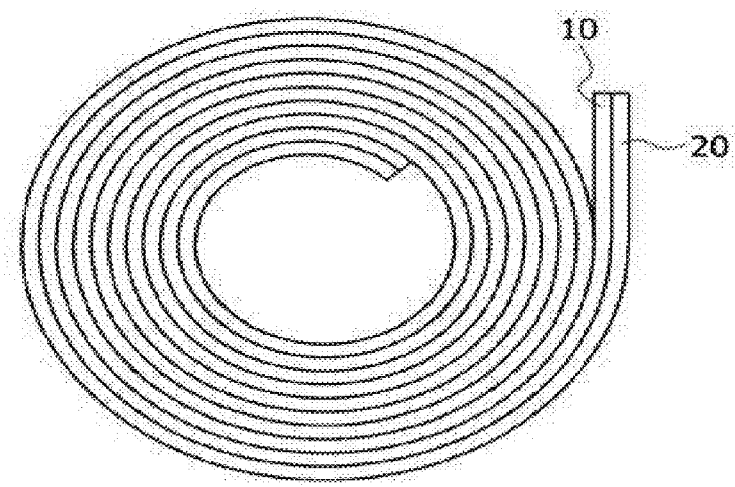

[FIG. 3]
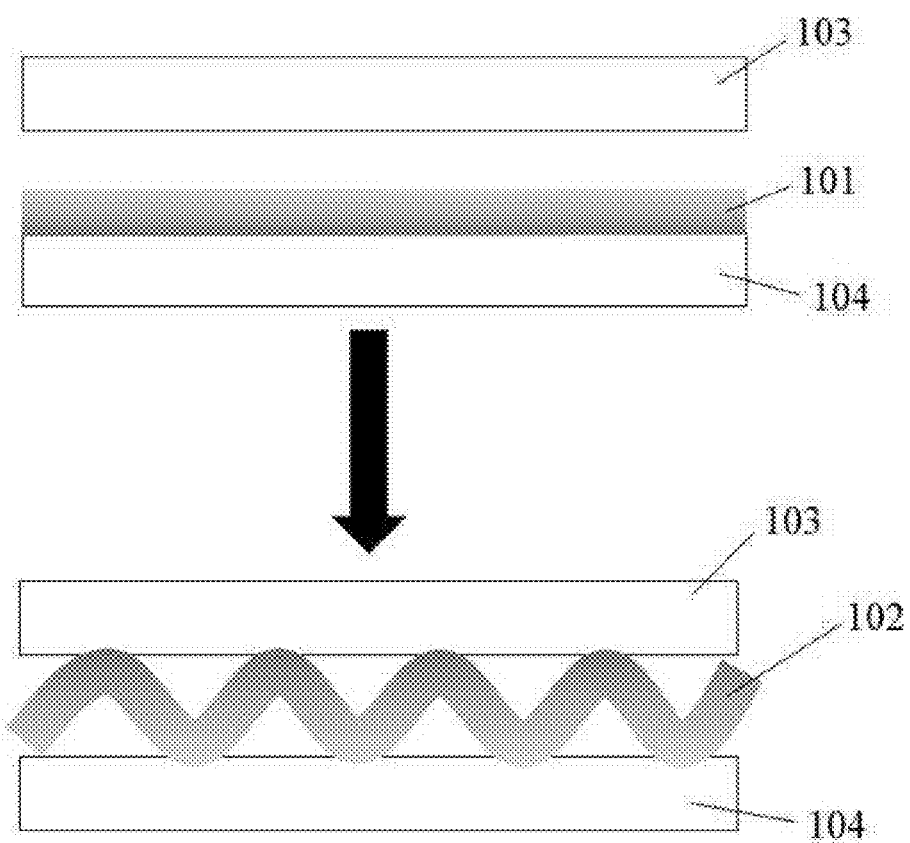

[FIG. 4]
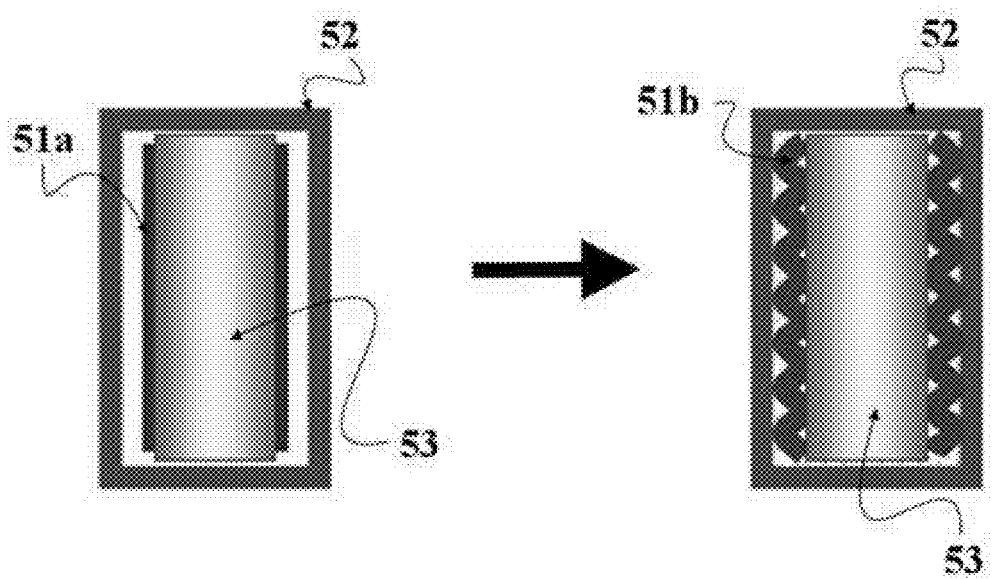

SWELLING TAPE FOR FILLING GAP

CROSS-REFERENCE TO RELATED APPLICATION

This application is a national phase entry under 35 U.S.C. § 371 of International Application No. PCT/KR2013/010473, filed Nov. 18, 2013, which claims priority to Korean Patent Application No. 10-2012-0130477, filed on Nov. 16, 2012 and Korean Patent Application No. 10-2013-0140163, filed on Nov. 18, 2013, the disclosures of which are incorporated herein by reference.

TECHNICAL FIELD

The present application relates to a swelling tape for filling a gap and its use.

BACKGROUND ART

In many cases, the need arises to fill a gap between two separated objects, and the two objects having the gap should be fixed in place by filling the gap.

For example, when a battery is manufactured by encasing an electrode assembly in a cylindrical can, the electrode assembly usually has a smaller size than the cylindrical can, so there is a gap between the electrode assembly and an inner wall of the can. In this case, the electrode assembly encased in the can is free to move therein in response to external vibration or impact, which may increase internal resistance of the battery or damage an electrode tab, considerably degrading battery performance. For this reason, the gap should be filled and the electrode assembly should be securely fixed in place.

DISCLOSURE

Technical Problem

The present application provides a swelling tape for filling a gap.

Technical Solution

The present application relates to a swelling tape for filling a gap. An example of the tape may include a substrate layer and a pressure-sensitive adhesive layer formed on one surface of the substrate layer.

Here, the substrate layer may be deformed in a length direction upon contact with a fluid such as a liquid. In one example, the substrate layer may be, for example, a substrate layer which expands in a length direction upon contact with a fluid such as a liquid.

The term "length direction" used herein may refer to a direction perpendicular to a thickness direction (for example, an arrow direction of FIG. 1) of the substrate layer when the substrate layer is maintained flat. In addition, the terms "perpendicular" and "level" used herein refer to substantially perpendicular and substantially level without diminishing a desired effect, and for example, may permit an error within ±10 degrees, ±5 degrees or ±3 degrees.

The substrate layer may be deformed, for example, may expand in an optional direction including a horizontal, vertical, or diagonal direction on a plane of the substrate layer as long as the layer is deformed, for example, expanded in a length direction.

In one example, the substrate layer may have a deformation ratio of 10% or more in a length direction according to Equation 2.

$$\text{Deformation ratio in length direction of substrate layer} = (L_2 - L_1)/L_1 \times 100 \quad \text{[Equation 2]}$$

In Equation 2, $L_1$ is an initial length before the substrate layer is in contact with a fluid, and $L_2$ is a length of the substrate layer measured after the substrate layer has been in contact with a fluid for 24 hours.

In calculating Equation 2, a specific kind of the fluid in contact with the substrate layer is selected depending on a particular state of a gap to be filled, but the present invention is not particularly limited thereto. In one example, when the gap to be filled is a gap formed between an electrode assembly and a can encasing the electrode assembly, the fluid may be a liquid electrolyte injected into the can. The term "electrolyte" may refer to, for example, a medium for ionic conduction used in a battery. In addition, the term "room temperature" may refer to a natural temperature which does not result from heating or cooling, for example, about 10° C. to 30° C., about 20° C. to 30° C. or about 25° C.

The substrate layer may be deformed according to a size of a three-dimensional shape to be implemented, and the deformation ratio in the length direction may be, for example, 30% or more, 40% or more, 50% or more, 60% or more, 70% or more, 80% or more or 90% or more. The upper limit of the deformation ratio in the length direction of the substrate layer is not particularly limited. That is, the higher the deformation ratio, the larger the three-dimensional shape that can be implemented. Thus, for example, according to the size of the desired three-dimensional shape, the deformation ratio can be regulated. For example, the deformation ratio of the substrate layer may be 500%.

In Equation 2, $L_1$ and $L_2$ are lengths of the substrate layer measured before and after contact with a fluid, respectively. The lengths are measured in a predetermined direction with respect to the substrate layer, but the direction for measuring the length is not particularly limited as long as directions applied to measure $L_1$ and $L_2$ are the same.

For example, when the substrate layer is a rectangular sheet, a length of the substrate layer may be a horizontal, vertical, or diagonal direction of the sheet, or a length in an optional direction in the plane of the sheet. However, since the measurement of $L_1$ and $L_2$ is performed in the same direction, for example, when $L_1$ is employed as the horizontal length of the substrate layer, $L_2$ is also employed as the horizontal length of the substrate layer.

The shape of the substrate layer is not particularly limited, and may be, for example, a film or sheet shape type. In addition, the film or sheet-type substrate layer may have a tetragonal, circular, triangular or amorphous shape.

The substrate layer may have a shore A hardness of 70 A or more according to ASTM D2240. The substrate layer may have a shore D hardness of 40 D or more according to JIS K-7311. As the hardness of the substrate layer is maintained as described above, excellent supporting strength and resistance may be provided to fill a gap when a three-dimensional shape is implemented, and extension and deformation of the film during unwinding of the film can be prevented. The upper limit of the hardness of the substrate layer is not particularly limited, but for example, the upper limit of the shore A hardness may be 100 A or 95 A, and the upper limit of the shore D hardness may be, for example, 100 D or 85 D.

As the substrate layer, for example, a layer including a thermoplastic polyurethane (TPU) film may be used. For example, the substrate layer may be a single layer of a TPU film, or a multilayer including at least one polyurethane film. In addition, as the TPU film, a uniaxially- or biaxially-oriented film, or a non-oriented film, may be used.

As the TPU film, a polyester TPU film, a polyether TPU film or a polycaprolactone TPU film is known, and among these films, a suitable kind may be selected, but a polyester TPU film may be suitably used. In addition, as the TPU film, an aromatic or aliphatic-based TPU film may be used. When the TPU film is used, a release layer may be further included to ensure a peeling strength to be described later by regulating an adhesive strength, but the present invention is not limited thereto.

As the TPU film, a polyol compound, for example, a polyester polyol compound, a chain extender, and an isocyanate compound, for example, a reaction product of a mixture including an aromatic or aliphatic diisocyanate compound, may be used, and a TPU film having desired physical properties can be provided by regulating ratios or kinds of the polyol compound forming a soft chain and the chain extender and the isocyanate compound, which form a hard chain. In one example, the substrate layer may include a polyester-based TPU film, and when needed, a film having a weight ratio in a unit derived from polyester polyol from the polyurethane and a unit derived from an isocyanate compound and/or a chain extender, which is regulated within a suitable range, may be used.

The substrate layer may have a single layer structure of the TPU film, or a multilayer structure, for example, a bilayer structure, including at least the TPU film.

When the substrate layer includes another film as well as the TPU film, the film may be a polymer film or sheet, which is manufactured to be deformed, for example, expand as described above upon contact with a fluid such as a liquid under an extension or contraction condition in the manufacture of the film or sheet.

In one example, the film may include an ester bond or an ether bond, or a cellulose ester compound. For example, the film may be an acrylate-based film, an epoxy-based film, or a cellulose-based film.

A pressure-sensitive adhesive layer may be formed on one surface of the substrate layer. The pressure-sensitive adhesive layer may be, for example, formed on at least one surface of the substrate layer in a direction parallel to the length direction of the substrate layer described above. FIG. 1 is a cross-sectional view of the exemplary tape, which is a tape (2) including a pressure-sensitive adhesive layer (202) formed in a direction parallel to a length direction of a substrate layer (201) on one surface of the substrate layer.

The tape may be implemented in a three-dimensional shape projecting in a direction perpendicular to the length direction of the substrate layer by expanding as the tape is fixed by the pressure-sensitive adhesive layer upon contact with a fluid.

To implement the three-dimensional structure, the pressure-sensitive adhesive layer may be designed to have a suitable peeling strength with respect to glass. For example, when the peeling strength is below a range for implementing a desired three-dimensional shape, the pressure-sensitive adhesive layer cannot suitably withstand stress induced by deformation, for example, expansion of the substrate layer, and thus the tape may peel off or may be difficult to implement in a three-dimensional shape. When the peeling strength is above the range, the pressure-sensitive adhesive layer over-inhibits the deformation of the substrate layer, and thus implementation of the three-dimensional shape can be difficult. The peeling strength may be, for example, 100 gf/25 mm or more, 150 gf/25 mm or more, 200 gf/25 mm or more, 300 gf/25 mm or more, 400 gf/25 mm or more, 500 gf/25 mm or more, 600 gf/25 mm or more, 700 gf/25 mm or more, 800 gf/25 mm or more, 900 gf/25 mm or more, 1,000 gf/25 mm or more, 1,100 gf/25 mm or more, 1,200 gf/25 mm or more, 1,300 gf/25 mm or more, 1,400 gf/25 mm or more, 1,500 gf/25 mm or more, 1,600 gf/25 mm or more, 1,700 gf/25 mm or more or 1,800 gf/25 mm or more. However, the peeling strength may be changed, for example, according to a size of a three-dimensional shape to be implemented or a gap to be filled, but the present invention is not particularly limited thereto. The peeling strength may be a peeling strength measured at room temperature, and at a peeling rate of 5 mm/sec and a peeling angle of 180 degrees.

The above-described peeling strength may be changed, for example, according to a size of a three-dimensional shape to be implemented or a gap to be filled, but the present invention is not particularly limited thereto. The peeling strength of the pressure-sensitive adhesive layer may be regulated in consideration of ability to implement a desired three-dimensional shape, and the upper limit thereof is not particularly limited thereto.

As the pressure-sensitive adhesive layer, various kinds of pressure-sensitive adhesive layers having the above-described range of peeling strength may be used. For example, as the pressure-sensitive adhesive layer, an acryl pressure-sensitive adhesive, a urethane pressure-sensitive adhesive, an epoxy pressure-sensitive adhesive, a silicon pressure-sensitive adhesive or a rubber-based pressure-sensitive adhesive may be used.

In one example, the pressure-sensitive adhesive layer may be an acrylic pressure-sensitive adhesive layer, and for example, may include an acrylic polymer crosslinked by a multifunctional crosslinking agent.

As the acrylic polymer, for example, one having a weight average molecular weight ($M_w$) of 400,000 or more may be used. The weight average molecular weight is a conversion value with respect to standard polystyrene measured by a gel permeation chromatography (GPC). The upper limit of the molecular weight of the acrylic polymer may be, but is not necessarily, controlled within a range of 2,500,000 or less.

The acrylic polymer may be included in a type in which a (meth)acrylic acid ester monomer and a copolymerizable monomer having a crosslinkable functional group are polymerized. Here, the weight ratio of the monomers is not particularly limited, and the polymer may be designed in consideration of a desired peeling strength.

The acrylic polymer may be included in a type in which a (meth)acrylic acid ester monomer and a copolymerizable monomer having a crosslinkable functional group are polymerized. Here, the weight ratio of the monomers is not particularly limited, and the polymer may be designed in consideration of a desired peeling strength.

The (meth)acrylic acid ester monomer included in the polymer may be, but is not limited to, for example, alkyl (meth)acrylate, in consideration of a cohesive strength, glass transition temperature, or pressure-sensitive adhesiveness of a pressure-sensitive adhesive, alkyl (meth)acrylate including an alkyl group having 1 to 14 carbon atoms may be used. As such a monomer, at least one of methyl (meth)acrylate, ethyl (meth)acrylate, n-propyl (meth)acrylate, isopropyl (meth) acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth) acrylate, isooctyl (meth)acrylate, isononyl (meth)acrylate, lauryl (meth)acrylate, and tetradecyl (meth)acrylate may be used, but the present invention is not limited thereto.

A copolymerizable monomer having a crosslinkable functional group is a monomer that may be copolymerized with another monomer included in the (meth)acrylic acid ester monomer or polymer and may provide a crosslinking point that can react with a multifunctional crosslinking agent to a main chain of the polymer after being copolymerized. Here, the crosslinkable functional group may be a hydroxyl group, a carboxyl group, an isocyanate group, a glycidyl group, or an amide group, and in some cases, a photocrosslinkable functional group such as an acryloyl group or a methacryloyl group. The photocrosslinkable functional group may be introduced by reacting a compound having a photocrosslinkable functional group with a crosslinkable functional group provided by the copolymerizable monomer. In the field of manufacturing pressure-sensitive adhesives, various copolymerizable monomers capable of being used according to a desired functional group are known. As an example of such a monomer, a monomer having a hydroxyl group such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate, or 2-hyroxypropyleneglycol (meth)acrylate; a monomer having a carboxyl group such as (meth)acrylic acid, 2-(meth)acryloyloxy acetic acid, 3-(meth)acryloyloxy propylic acid, 4-(meth)acryloyloxy butyric acid, an acrylic acid dimer, an itaconic acid, a maleic acid and a maleic acid anhydride; or glycidyl (meth)acrylate, (meth)acrylamide, N-vinyl pyrrolidone, or N-vinyl caprolactame, may be used, but the present invention is not limited thereto. One or at least two of such monomers may be included in the polymer.

The acrylic polymer may further include another comonomer in a polymerized form when needed, and may be, for example, a monomer represented by Formula 1.

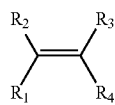

[Formula 1]

In Formula 1, $R_1$ to $R_3$ are each independently hydrogen or alkyl, $R_4$ is cyano; phenyl unsubstituted or substituted with alkyl; acetyloxy; or $COR_5$, and here, $R_5$ is amino or glycidyloxy unsubstituted or substituted with alkyl or alkoxyalkyl.

In the definition of $R_1$ to $R_5$ in Formula 1, alkyl or alkoxy may be alkyl or alkoxy having 1 to 8 carbon atoms, and preferably, methyl, ethyl, methoxy, ethoxy, propoxy, or butoxy.

As a particular example of the monomer of Formula 1, vinyl ester of carboxylic acid such as (meth)acrylonitrile, N-methyl (meth)acrylamide, N-butoxy methyl (meth)acrylamide, styrene, methyl styrene, or vinyl acetate may be used, but the present invention is not limited thereto.

The acrylic polymer may be prepared by, for example, solution polymerization, photo polymerization, bulk polymerization, suspension polymerization or emulsion polymerization.

A kind of a multifunctional crosslinking agent crosslinking the acrylic polymer in the pressure-sensitive adhesive layer is not particularly limited, and for example, a suitable crosslinking agent may be selected from known crosslinking agents such as an isocyanate crosslinking agent, an epoxy crosslinking agent, an aziridine crosslinking agent, a metal chelate crosslinking agent, and a photocrosslinking agent, according to a kind of a crosslinkable functional group present in the polymer. Here, as an example of the isocyanate crosslinking agent, diisocyanate such as tolylene diisocyanate, xylene diisocyanate, diphenylmethane diisocyanate, hexamethylene diisocyanate, isoboron diisocyanate, tetramethylxylene diisocyanate or naphthalene diisocyanate; or a reaction product between the diisocyanate and a polyol, may be used, and here, the polyol may be trimethylol propane. The epoxy crosslinking agent may be ethyleneglycol diglycidylether, triglycidylether, trimethylolpropane triglycidylether, N,N,N',N'-tetraglycidyl ethylenediamine or glycerin diglycidylether, the aziridine crosslinking agent may be N,N'-toluene-2,4-bis(1-aziridinecarboxamide), N,N'-diphenylmethane-4,4'-bis(1-aziridinecarboxamide), triethylene melamine, bisisoprothaloyl-1-(2-methylaziridine) or tri-1-aziridinylphosphineoxide, and the metal chelate crosslinking agent may be a compound in which a polyvalent metal is coordinated to a compound such as acetyl acetine or acetoacetic acid ethyl. Here, the polyvalent metal may be aluminum, iron, zinc, tin, titanium, antimony, magnesium or vanadium, and the photocrosslinking agent may be a multifunctional acrylate. Here, in consideration of the kind of the crosslinkable functional group included in the polymer, one or at least two crosslinking agents may be used.

In the pressure-sensitive adhesive layer, a weight ratio of the multifunctional crosslinking agent may be regulated in consideration of a desired peeling strength.

The above-described pressure-sensitive adhesive layer may be formed by coating a coating solution prepared by blending the acrylic polymer and a multifunctional crosslinking agent, and inducing a crosslinking reaction between the polyol and the multifunctional crosslinking agent under suitable conditions.

The pressure-sensitive adhesive layer may further include at least one additive selected from the group consisting of coupling agent, a tackifier, an epoxy resin, a UV stablizer, an antioxidant, a coloring agent, a reinforcing agent, a filler, a foaming agent, a surfactant, and a plasticizer, without diminishing a desired effect.

A thickness of the pressure-sensitive adhesive layer may be suitably selected according to application, for example, desired peeling strength or three-dimensional shape implementing ability, or a size of a gap to be filled, but is not particularly limited.

The tape may further include a release sheet attached to the pressure-sensitive adhesive layer to protect the pressure-sensitive adhesive layer before the tape is used.

A back-side coating layer may be included on one surface of the substrate layer, for example, a surface opposite to the surface having the pressure-sensitive adhesive layer to regulate a pressure-sensitive adhesive strength. The back-side coating layer may include, for example, a fluorine-base releasing agent, a silicon-based releasing agent, a releasing agent containing silicon and having a vinyl or acryl group, or an aliphatic or amide-based releasing agent. The back-side coating layer may be formed through releasing treatment using the releasing agent. Here, a specific method for the releasing treatment or a thickness of the back-side coating layer is not particularly limited, and the treatment will be performed to ensure a peeling strength.

The swelling tape may have a peeling strength of the pressure-sensitive adhesive layer (hereinafter, referred to as a "back-side peeling strength") of 400 gf/25 mm or less, 350 gf/25 mm or less, 300 gf/25 mm or less, 250 gf/25 mm or less, 200 gf/25 mm or less, 150 gf/25 mm or less, 100 gf/25 mm or less or 50 gf/25 mm or less, which is measured at room temperature and at a peeling rate of 5 mm/sec and a peeling angle of 180 degrees with respect to a surface opposite to the surface of the substrate layer on which the pressure-sensitive adhesive layer is formed. As the back-side peeling strength is regulated within the above-described range, a roll-type tape having an excellent unwinding property can be provided. Here, the term "back-side peeling strength" may refer to a peeling strength of the pressure-sensitive adhesive layer with respect to the other surface of the substrate layer, that is, a surface opposite to the surface of the substrate layer on which the pressure-sensitive adhesive layer is formed. The swelling tape may be wound in a state in which the pressure-sensitive adhesive layer is attached to the other surface of the substrate, that is, the opposite surface to the surface of the substrate layer on which the pressure-sensitive adhesive layer is formed.

FIG. 2 is a diagram showing an exemplary tape wound in a roll shape. In one example, the tape may be, as shown in FIG. 2, wound in a state in which the pressure-sensitive adhesive layer (10) is attached to the other surface of the substrate layer. The other surface of the substrate layer (20) may be a surface opposite to the surface of the substrate layer (20) on which the pressure-sensitive adhesive layer (10) is formed. The swelling tape has an excellent unwinding property in a wound state. Accordingly, noise is not generated, for example, in high-speed cutting, high-speed lamination, and pressing of folding lines, and a stick-and-slip phenomenon, or a change in pressure-sensitive adhesive strength due to extension during unwinding does not occur. Accordingly, the swelling tape can maintain an excellent working environment even when it is applied to the process in a wound state and can enhance productivity of a product or parts. The lower the lower limit of the back-side peeling strength, the better. However, the lower limit is not particularly limited, and may be, for example, about 45 gf/25 mm, 40 gf/25 mm, 35 gf/25 mm, 30 gf/25 mm, 25 gf/25 mm, 20 gf/25 mm, 15 gf/25 mm, 10 gf/25 mm or 5 gf/25 mm.

The swelling tape according to the present invention can have various uses, for example, it may be used as a swelling tape for filling a gap. The phrase "swelling tape for filling a gap" used herein may refer to a tape filling a gap between two separate objects and fixing the two objects to each other. In one example, the swelling tape may be a tape which can be implemented in a three-dimensional shape capable of filling a gap due to a balance between power generated by expanding the substrate layer and a fixing strength of the pressure-sensitive adhesive layer when the tape is attached to either of two objects separated by a gap by the pressure-sensitive adhesive layer, for example, when the tape is in contact with a fluid such as a liquid. In one example, the two objects separated by a gap may be an electrode assembly and a can encasing the electrode assembly of a battery, respectively, but the present invention is not limited thereto. In this case, the tape may be, for example, a line tape for an electrode assembly which may be used to prevent unwinding of the electrode assembly and to fix the electrode assembly to an inside of the can of the battery.

FIG. 3 is a schematic diagram showing a process of filling a gap with the swelling tape by being implemented in a three-dimensional shape between gaps.

As shown in FIG. 3, the tape (101) is attached to either one (104) of two objects (103 and 104) having a gap by means of the pressure-sensitive adhesive layer. When the swelling tape (101) is attached to the object as described above, and a fluid is introduced into the gap and is in contact with the substrate layer of the swelling tape (101), the substrate layer expands in a length direction. Here, since the substrate layer expands when the tape (101) is fixed to the object (104) using the pressure-sensitive adhesive layer, the swelling tape (101) takes on a three-dimensional shape which allows it to fill the gap and fix the two objects (103 and 104) having the gap to each other when needed.

A size of the three-dimensional shape implemented by the swelling tape, that is, a width of the gap, may be 0.001 mm to 2.0 mm, 0.001 mm to 1.0 mm or 0.01 mm to 0.5 mm. However, the size of the three-dimensional shape may be changed depending on a specific kind of the gap to which the swelling tape is applied, but the present invention is not particularly limited thereto. The size of the three-dimensional shape according to the size of a gap to which the swelling tape is applied may be suitably controlled by regulating the above-described deformation ratio of the substrate layer or the peeling strength of the pressure-sensitive adhesive layer.

The swelling tape for filling a gap according to the present invention may satisfy the following Equation 1.

$$1.5 \leq X_2/X_1 \leq 150 \quad \text{[Equation 1]}$$

In Equation 1, $X_1$ is the peeling strength of the pressure-sensitive adhesive layer measured with respect to a surface opposite to the surface of the substrate layer on which the pressure-sensitive adhesive layer is formed at room temperature and at a peeling rate of 5 mm/sec and a peeling angle of 180 degrees, and $X_2$ is the peeling strength measured with respect to glass at room temperature and at a peeling rate of 5 mm/sec and a peeling angle of 180 degrees.

The ratio $(X_2/X_1)$ of the peeling strength $(X_2)$ of the pressure-sensitive adhesive layer with respect to glass to the peeling strength $(X_1)$ of the pressure-sensitive adhesive layer with respect to the opposite surface to the surface of the substrate layer on which the pressure-sensitive adhesive layer is formed may be regulated within, but is not particularly limited to, a suitable range such as 2.5 to 140, 5 to 130, 7.5 to 120, 10 to 110, 12.5 to 100, 15 to 90, 17.5 to 80, 20 to 70, or 22.5 to 60. As the ratio $(X_2/X_1)$ of the peeling strength $(X_2)$ of the pressure-sensitive adhesive layer with respect to glass to the peeling strength $(X_1)$ of the pressure-sensitive adhesive layer with respect to the opposite surface to the surface of the substrate layer on which the pressure-sensitive adhesive layer is formed is regulated within the above-described range to be more efficiently formed in a three-dimensional shape, the tape can be suitably used to fill gaps and fix objects having gaps as needed.

Another aspect of the present invention provides a method of filling a gap. The exemplary method may be a method of filling a gap formed by a first substrate and a second substrate spaced apart from the first substrate. The method may include, for example, attaching a pressure-sensitive adhesive layer of the swelling tape to the first or second substrate, and contacting a substrate layer of the swelling tape with a fluid to deform, for example, expand, the substrate layer in a length direction.

In this method, specific kinds and shapes of the first and second substrates forming a gap are not particularly limited. That is, a gap to be filled is formed between the first and second substrates, and any kind of substrate allowing a fluid to be introduced into a gap may be used.

In addition, the shape of the substrate is not particularly limited either, and for example, the substrate may be formed in a flat shape, a curved shape, or an irregular shape. The method may be performed, as shown in FIG. 3, by forming a tape (102) having a three-dimensional shape by contacting the substrate layer with a fluid to expand in a state in which the tape 101 is attached to either one of first and second substrates (103 and 104) forming a gap by means of a pressure-sensitive adhesive layer.

In one example, either one of the first and second substrates used in the method is an electrode assembly for a battery, and the other is a can encasing the assembly, and the fluid in contact with the tape may be an electrolyte included in the battery.

As described above, for example, the method may be performed by encasing the tape in a can after attaching it to the electrode assembly and injecting the electrolyte into the can.

A specific kind of the electrode assembly is not particularly limited, and a general assembly used in the art may also be included. In one example, the electrode assembly may be a secondary battery, for example, an electrode assembly for a lithium secondary battery.

The electrode assembly may include a positive electrode plate, a negative electrode plate, and a separator interposed between the positive electrode plate and the negative electrode plate. According to this method, the swelling tape may be attached to a circumferential surface to the electrode assembly by means of the pressure-sensitive adhesive layer. The electrode assembly may be wound in a jelly roll shape in some cases.

The positive electrode plate may include a positive electrode collector composed of a metal thin plate having excellent conductivity, and a positive electrode active material layer coated on a surface of the positive electrode collector. In addition, regions on which the positive electrode active material are not coated is formed on both ends of the positive electrode plate, and positive electrode tabs projecting above or below the electrode assembly in a predetermined length may be attached to the regions. The positive electrode tab may serve to electrically connect the electrode assembly with another part of the battery.

In addition, the negative electrode plate may include a negative electrode collector composed of a metal thin plate having excellent conductivity, and a negative electrode active material layer coated on a surface of the negative electrode collector. In addition, regions on which the negative electrode active material are not coated are formed on both ends of the negative electrode plate, and negative electrode tabs projecting above or below the electrode assembly to a predetermined length may be attached to the regions. The negative electrode tabs may serve to electrically connect the electrode assembly with another part of the battery.

In addition, the electrode assembly is used to prevent contact with a cap assembly or a cylindrical can, and may further include an insulating plate formed on and/or under the electrode assembly.

The swelling tape may be attached to include a finishing part of a circumferential surface of the electrode assembly, in which the outermost end of the separator is disposed, and to surround a circumferential surface. In addition, the swelling tape may be attached to cover at least 30% or more of the entire surface of the circumferential surface of the electrode assembly, and upper and lower ends of the circumferential surface of the electrode assembly may be attached to expose the assembly.

The kind of the can encasing the electrode assembly is not particularly limited, and for example, as a known kind in the art, a cylindrical can may be used.

In addition, here, the kind of the electrolyte, which is a fluid deforming, for example, expanding the tape, is not particularly limited, and according to the kind of the battery, an electrolyte known in the art is used. For example, when the battery is a lithium secondary battery, the electrolyte may include, for example, a non-aqueous organic solvent and a lithium salt. Here, the lithium salt is dissolved in an organic solvent, thereby serving as a source of lithium ions in the battery, and stimulating transfer of lithium ions between an anode and a cathode. As the lithium salt, at least one of $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x}+1SO_2)(C_yF_{2y}+1SO_2)$ (here, x and y are natural numbers), $LiCl$, $LiI$, and lithium bisoxalate borate may be included as a supporting electrolyte. A concentration of the lithium salt in the electrolyte may be changed according to its use, and the lithium salt may be generally used in a range of 0.1M to 2.0M. In addition, the organic solvent may be, for example, one or at least two of benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene (iodobenzene), 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (where R is a linear, branched, or cyclic hydrocarbon group having 2 to 50 carbon atoms, which may be a double bond, an aromatic ring, or an ether bond), dimethylformamide, dimethylacetate, xylene, cyclohexane, tetrahydrofuran, 2-methyltetrahydrofuran, cyclohexanone, ethanol, isopropyl alcohol, dimethyl carbonate, ethylmethyl carbonate, diethyl carbonate, methylpropyl carbonate, propylene carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, gamma butyrolactone, sulfolane, valerolactone, decanolide and mevalolactone, but the present invention is not limited thereto.

In the swelling tape, a pressure-sensitive adhesive layer having a predetermined peeling strength is formed on the substrate layer having a deformation characteristic, for example, an expansion characteristic, as described above. Accordingly, after applying the above-described method, for example, as the tape may be attached to the electrode assembly, the three-dimensional shape can be implemented. As a result, the tape can effectively fill a gap between the electrode assembly and an inner wall of the can and fix the electrode assembly in place, thereby preventing movement or shaking of the electrode assembly.

That is, the "three-dimensional shape" of the swelling tape is formed by interaction of a deforming strength of the substrate layer and a peeling strength of the pressure-sensitive adhesive layer of the swelling tape in contact with the electrolyte, and may include all forms capable of tightly fixing the electrode assembly in the can.

FIG. 4 is an example battery manufactured by the above-described method, in which swelling tapes (51a and 51b) swell to form a three-dimensional shape when permeated by an electrolyte, and an electrode assembly (53) is fixed to a can (52).

For example, as shown in the left diagram of FIG. 4, the swelling tape (51a) may be maintained in a flat shape after attaching it to the assembly (53) and inserting the assembly into the can (52). However, after a predetermined time passes since the assembly is in contact with the electrolyte inserted into the can (52), as shown in the right diagram of FIG. 4, the swelling tape (51b) may be deformed into a three-dimensional shape to fill a gap between the electrode assembly (53) and the can (52) and fix them in place.

Advantageous Effects

A swelling tape according to the present application is, for example applied between gaps in which a fluid is present, thereby morphing into a three-dimensional shape, and thus can be used to fill gaps and fix objects separated by gaps as needed.

DESCRIPTION OF DRAWINGS

FIG. 1 is a cross-sectional view of a swelling tape.
FIG. 2 is a diagram showing a wound state of the swelling tape.
FIG. 3 is a diagram showing a process of deforming the swelling tape into a three-dimensional shape.
FIG. 4 is a diagram showing a process of deforming the swelling tape into a three-dimensional shape in the manufacture of a battery.

MODES OF INVENTION

Hereinafter, a swelling tape will be described in detail with reference to Examples and Comparative Examples, and the scope of the swelling tape is not limited to the following Examples.

In the Examples and Comparative Examples, physical properties are evaluated by the following methods.

1. Measurement of Deformation Ratio of Substrate Layer in Length Direction

A specimen was manufactured by cutting a substrate layer to have a horizontal length of 10 mm, and a vertical length of 50 mm. The specimen was immersed in a carbonate-based electrolyte, left in a sealed state at room temperature for one day, and taken out of the electrolyte to measure a length in a vertical direction of the specimen and a deformation ratio in a length direction of the substrate layer according to Equation A.

$$\text{Deformation ratio in length direction} = (L_2 - L_1)/L_1 \times 100 \quad \text{[Equation A]}$$

In Equation A, $L_1$ is an initial length in a vertical direction of the substrate layer before immersion in the electrolyte, that is, 50 mm, and $L_2$ is a length in a vertical direction of the substrate layer measured after immersion in the electrolyte.

2. Measurement of Peeling Strength of Swelling Tape

A specimen was manufactured by cutting a swelling tape to have a horizontal length of 25 mm and a vertical length of 200 mm. The sample was attached to a glass plate with a pressure-sensitive adhesive layer using a 2 kg rubber roller, and peeling strength was measured while the swelling tape was peeled off using a tensile tester at room temperature and at a peeling rate of 5 mm/sec and a peeling angle of 180 degrees.

3. Evaluation of Ability of Swelling Tape to Form Three-Dimensional Shape

Batteries manufactured in the Examples and Comparative Examples were stored at room temperature for one day, disassembled to take an electrode assembly out from the battery, and a state of the swelling tape attached to the electrode assembly was evaluated, thereby evaluating ability to form a three-dimensional shape according to the following criteria.

<Criteria for Evaluating Ability to Form Three-Dimensional Shape>
 ○: three-dimensional shape of the swelling tape was observed
 Δ: three-dimensional shape of the swelling tape was not observed
 x: three-dimensional shape of the swelling tape was not observed, and the tape had peeled off of the electrode assembly 4. Evaluation of Gap-Filling Ability (Electrode Assembly Movement Preventing Ability) of Swelling Tape Gap-filling ability of the swelling tape was evaluated by a method of evaluating a movement preventing characteristic of the electrode assembly. In this method, for example, a low vibration evaluating method and a low impact evaluating method were included. In the low vibration method, a method for a vibration test was according to the UN38.3 specification, and when the battery was cut-off after evaluation, it was determined as cutting-off of a terminal by movement. In the low impact evaluation method, when the battery was put into an octagonal cylinder, rotated, and cut-off after predetermined time passed, it was determined as cutting-off of a terminal by movement. The gap-filling ability of the swelling tape evaluated by the above-described method was evaluated according to the following criteria.

<Criteria for Evaluation of Gap-Filling Ability>
 ○: power of the battery was measured after evaluation of low vibration and low impact
 Δ: power of the battery was measured after evaluation of low vibration and low impact, but resistance increased by 10% or more
 x: power of the battery was not measured after evaluation of low vibration and low impact 5. Measurement of Back-Side Peeling Ability A pressure-sensitive adhesive layer of the manufactured swelling tape was attached to an aluminum plate. In this operation, the tape was cut to have a horizontal length of 70 mm and a vertical length of 150 mm before use. Afterward, an identical swelling tape was attached again to a top surface of the attached tape. In this operation, the tape was cut to have a horizontal length of 25 mm, and a vertical length of 130 mm before use. After the attachment of the second tape, the aluminum plate was fixed at room temperature, and the second tape was bent at 180 degrees and then fixed to a PET film. Subsequently, back-side peeling strength was evaluated by peeling the second tape at a peeling rate of 5 mm/sec.

For reproducibility, peeling strengths were evaluated with respect to the same specimen 5 to 10 times, and the average of the measured peeling strengths were listed below.

Example 1

Manufacture of Swelling Tape

A non-extensible film manufactured of thermoplastic polyurethane (TPU) and having a thickness of about 40 μm was used as a substrate layer. A pressure-sensitive adhesive layer having a peeling strength with respect to a SUS plate of 600 gf/25 mm and a thickness of 15 μm was formed on one surface of the substrate layer as an acrylic-based pressure-sensitive adhesive layer including 100 parts by weight of an acrylic pressure-sensitive adhesive resin crosslinked with about 0.2 parts by weight of an isocyanate crosslinking agent. Afterward, in consideration of a desired back-side peeling strength (20 gf/25 mm) of a surface of the substrate layer opposite to a surface having the pressure-sensitive adhesive layer, a back-side coating layer was formed as a fluorine-based releasing agent, resulting in manufacture of a swelling tape.

Manufacture of Electrode Assembly and Battery

The swelling tape was attached to cover an area corresponding to about 50% of a circumference of an electrode assembly (cross-sectional diameter: 17.2 mm) formed in a jelly roll type and including a cathode, an anode and a separator, and the assembly was inserted into a cylindrical can (cross-sectional diameter: 17.5 mm). Subsequently, a carbonate-based electrolyte was injected into the can and the can was sealed, thereby completing a battery.

Example 2

Manufacture of Swelling Tape

A non-extensible film manufactured of thermoplastic polyurethane (TPU) and having a thickness of about 40 μm was used as a substrate layer. A pressure-sensitive adhesive layer having a peeling strength with respect to a SUS plate of 595 gf/25 mm and a thickness of 15 μm was formed on one surface of the substrate layer as an acrylic-based pressure-sensitive adhesive layer including 100 parts by weight of an acrylic pressure-sensitive adhesive resin crosslinked with about 0.2 parts by weight of an isocyanate crosslinking agent. Afterward, in consideration of a desired back-side peeling strength (20 gf/25 mm) of a surface of the substrate layer opposite to a surface having the pressure-sensitive adhesive layer, a back-side coating layer was formed as a silicon-based releasing agent, resulting in manufacture of a swelling tape.

Manufacture of Electrode Assembly and Battery

The swelling tape was attached to cover an area corresponding to about 50% of a circumference of an electrode assembly (cross-sectional diameter: 17.2 mm) formed in a jelly roll type and including a cathode, an anode and a separator, and the assembly was inserted into a cylindrical can (cross-sectional diameter: 17.5 mm). Subsequently, a carbonate-based electrolyte was injected into the can and the can was sealed, thereby completing a battery.

Example 3

Manufacture of Swelling Tape

A non-extensible film manufactured of thermoplastic polyurethane (TPU) and having a thickness of about 40 μm was used as a substrate layer. A pressure-sensitive adhesive layer having a peeling strength with respect to a SUS plate of 600 gf/25 mm and a thickness of 15 μm was formed on one surface of the substrate layer as an acrylic-based pressure-sensitive adhesive layer including 100 parts by weight of an acrylic pressure-sensitive adhesive resin crosslinked with about 0.2 parts by weight of an isocyanate crosslinking agent. Afterward, in consideration of a desired back-side peeling strength (10 gf/25 mm) of a surface of the substrate layer opposite to a surface having the pressure-sensitive adhesive layer, a back-side coating layer was formed as an aliphatic releasing agent, resulting in manufacture of a swelling tape.

Manufacture of Electrode Assembly and Battery

The swelling tape was attached to cover an area corresponding to about 50% of a circumference of an electrode assembly (cross-sectional diameter: 17.2 mm) formed in a jelly roll type and including a cathode, an anode and a separator, and the assembly was inserted into a cylindrical can (cross-sectional diameter: 17.5 mm). Subsequently, a carbonate-based electrolyte was injected into the can and the can was sealed, thereby completing a battery.

Comparative Example 1

Manufacture of Swelling Tape

A non-extensible film manufactured of thermoplastic polyurethane (TPU) and having a thickness of about 40 μm was used as a substrate layer. A pressure-sensitive adhesive layer having a peeling strength with respect to a SUS plate of 605 gf/25 mm and a thickness of 15 μm was formed on one surface of the substrate layer as an acrylic-based pressure-sensitive adhesive layer including 100 parts by weight of an acrylic pressure-sensitive adhesive resin crosslinked with about 0.2 parts by weight of an isocyanate crosslinking agent, resulting in manufacture of a swelling tape. Separate releasing treatment was not performed on the substrate layer, and a measured back-side peeling strength was 500 gf/25 mm.

Manufacture of Electrode Assembly and Battery

The swelling tape was attached to cover an area corresponding to about 50% of a circumference of an electrode assembly (cross-sectional diameter: 17.2 mm) formed in a jelly roll type and including a cathode, an anode and a separator, and the assembly was inserted into a cylindrical can (cross-sectional diameter: 17.5 mm). Subsequently, a carbonate-based electrolyte was injected into the can and the can was sealed, thereby completing a battery.

Comparative Example 2

Manufacture of Swelling Tape

A non-extensible film manufactured of thermoplastic polyurethane (TPU) and having a thickness of about 40 μm was used as a substrate layer. A pressure-sensitive adhesive layer having a peeling strength with respect to a SUS plate of 100 gf/25 mm and a thickness of 15 μm was formed on one surface of the substrate layer as an acrylic-based pressure-sensitive adhesive layer including 100 parts by weight of an acrylic pressure-sensitive adhesive resin crosslinked with about 2 parts by weight of an isocyanate crosslinking agent, resulting in manufacture of a swelling tape. Separate releasing treatment was not performed on the substrate layer, and a measured back-side peeling strength was 70 gf/25 mm.

Manufacture of Electrode Assembly and Battery

The swelling tape was attached to cover an area corresponding to about 50% of a circumference of an electrode assembly (cross-sectional diameter: 17.2 mm) formed in a jelly roll type and including a cathode, an anode and a separator, and the assembly was inserted into a cylindrical can (cross-sectional diameter: 17.5 mm). Subsequently, a carbonate-based electrolyte was injected into the can and the can was sealed, thereby completing a battery.

Physical properties measured in Examples and Comparative Examples are summarized and listed in Table 1.

TABLE 1

|  | Examples | | | Comparative Examples | |
| --- | --- | --- | --- | --- | --- |
|  | 1 | 2 | 3 | 1 | 2 |
| Substrate deformation ratio (%) | 16 | 16 | 16 | 16 | 16 |

TABLE 1-continued

|  | Examples | | | Comparative Examples | |
| --- | --- | --- | --- | --- | --- |
|  | 1 | 2 | 3 | 1 | 2 |
| Peeling strength to glass (gf/25 mm) | 570 | 550 | 580 | 550 | 50 |
| Back-side peeling strength (gf/25 mm) | 20 | 20 | 10 | 500 | 70 |
| Unwinding property | Smoothly unwound | Smoothly unwound | Smoothly unwound | Failed | Smoothly unwound |
| Three-dimensional shape implementing ability | ○ | ○ | ○ | ○ | x |
| Gap-filling ability (Movement preventing ability) | ○ | ○ | ○ | ○ | x |
| Movement preventing test performed to 10 samples | Failed, 0 | Failed, 0 | Failed, 0 | Failed, 0 | Failed, 3 |

Failed in unwinding property: winkles were generated on the film in evaluation of an unwinding property

EXPLANATION OF MARKS

10: pressure-sensitive adhesive layer
20: substrate layer
103, 104: objects forming a gap
101: swelling tape before implementation of three-dimensional shape
102: swelling tape after implementation of three-dimensional shape
2: swelling tape
201: substrate layer
202: pressure-sensitive adhesive layer
51a, 51b: swelling tape
52: can
53: electrode assembly

The invention claimed is:

1. A swelling tape for filling a gap, comprising:
a substrate layer that is deformed in a length direction upon contact with a fluid;
a pressure-sensitive adhesive layer formed in a direction parallel to the length direction of the substrate layer on one surface of the substrate layer, and satisfying Equation 1; and
a back-side coating layer present on a surface opposite to the surface of the substrate layer on which the pressure-sensitive adhesive layer is formed,
wherein the substrate layer has a shore A hardness according to ASTM D2240 of 70 A or more, or the substrate layer has a shore D hardness according to JIS K-7311 of 40 D or more, wherein the recited hardnesses are maintained after the substrate is in contact with the fluid,
wherein the back-side coating layer comprises at least one selected from the group consisting of a fluorine-based releasing agent, a silicon-based releasing agent, a releasing agent containing silicon and having a vinyl or acrylic group, and an amide-based releasing agent:

$$1.5 \leq X_2/X_1 \leq 150 \quad \text{[Equation 1]}$$

where $X_1$ is a peeling strength of the pressure-sensitive adhesive layer measured at room temperature, and at a peeling rate of 5 mm/sec and a peeling angle of 180 degrees with respect to the surface opposite to the surface of the substrate layer on which the pressure-sensitive adhesive layer is formed, and $X_2$ is a peeling strength measured with respect to glass at room temperature and at a peeling rate of 5 mm/sec and a peeling angle of 180 degrees,
wherein the $X_1$ is 20 gf/25 mm or less.

2. The swelling tape for filling a gap of claim 1, wherein the swelling tape is deformed into a three-dimensional shape having a height of 0.001 mm to 2.00 mm in a direction perpendicular to the length direction of the substrate layer upon contact with the fluid.

3. The swelling tape for filling a gap of claim 1, wherein the substrate layer has a deformation ratio in the length direction according to Equation 2 of 10% or more:

$$\text{Deformation ratio in length direction} = (L_2-L_1)/L_1 \times 100 \quad \text{[Equation 2]}$$

where $L_1$ is an initial length before the substrate layer is in contact with the fluid, and $L_2$ is a length of the substrate layer measured at room temperature or 60° C. after the substrate layer has been in contact with the fluid for 24 hours.

4. The swelling tape for filling a gap of claim 1, wherein the substrate layer comprises thermoplastic polyurethane.

5. The swelling tape for filling a gap of claim 1, wherein the pressure-sensitive adhesive layer comprises an acrylic pressure-sensitive adhesive, a urethane pressure-sensitive adhesive, an epoxy pressure-sensitive adhesive, a silicon pressure-sensitive adhesive, or a rubber pressure-sensitive adhesive.

6. The swelling tape for filling a gap of claim 1, wherein the pressure-sensitive adhesive layer comprises an acrylic polymer crosslinked with a multifunctional crosslinking agent.

7. The swelling tape for filling a gap of claim 1, wherein the pressure-sensitive adhesive layer is attached to and wound around the surface opposite to the surface of the substrate layer on which the pressure-sensitive adhesive layer is formed.

8. The swelling tape for filling a gap of claim 1, wherein the $X_2$ is 100 gf/25 mm or more.

9. A method of filling a gap formed between a first substrate and a second substrate spaced apart from the first substrate, comprising:
attaching the pressure-sensitive adhesive layer of the swelling tape of claim 1 to the first or second substrate; and
contacting the substrate layer of the swelling tape of claim 1 with a fluid.

10. The method of filling a gap of claim 9, wherein either one of the first and second substrates is an electrode assembly, and the other is a can encasing the assembly.

11. An electrode assembly having a circumferential surface to which the swelling tape of claim 1 is attached.

12. A battery, comprising:
the electrode assembly of claim 11;
a can encasing the assembly; and
an electrolyte in contact with the assembly in the can.

13. The battery of claim 12, wherein the swelling tape of the electrode assembly fixes the assembly to an inside of the can by deforming into a three-dimensional shape upon contact with the electrolyte.

14. The battery of claim 13, wherein the electrolyte is a carbonate-based electrolyte.

* * * * *